(12) United States Patent
Lam

(10) Patent No.: US 9,161,064 B2
(45) Date of Patent: Oct. 13, 2015

(54) AUTO-SCALING MANAGEMENT OF WEB CONTENT

(75) Inventor: Anthony Lam, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 489 days.

(21) Appl. No.: 13/592,835

(22) Filed: Aug. 23, 2012

(65) Prior Publication Data

US 2014/0059179 A1 Feb. 27, 2014

(51) Int. Cl.
| | | |
|---|---|---|
| G06F 15/173 | (2006.01) | |
| H04N 21/2343 | (2011.01) | |
| H04N 21/258 | (2011.01) | |
| H04L 12/26 | (2006.01) | |
| H04N 21/45 | (2011.01) | |
| G06F 9/50 | (2006.01) | |
| H04N 21/2665 | (2011.01) | |
| H04L 29/08 | (2006.01) | |
| G06F 11/34 | (2006.01) | |

(52) U.S. Cl.
CPC ...... *H04N 21/234363* (2013.01); *G06F 9/5011* (2013.01); *G06F 11/3442* (2013.01); *H04L 43/0817* (2013.01); *H04L 67/1002* (2013.01); *H04N 21/25841* (2013.01); *H04N 21/4524* (2013.01); *G06F 9/5083* (2013.01); *G06F 11/3419* (2013.01); *G06F 11/3495* (2013.01); *H04L 67/1008* (2013.01); *H04L 67/1031* (2013.01); *H04N 21/23439* (2013.01); *H04N 21/2665* (2013.01)

(58) Field of Classification Search
CPC .................. H04N 21/234364; H04N 21/2581; H04N 21/4524; H04N 21/2665; H04N 21/23439; H04L 67/1002; H04L 67/1008; H04L 67/1031; G06F 9/5011; G06F 9/5083; G06F 11/3442; G06F 11/3495; G06F 11/3419
USPC .................................................. 709/223–224
See application file for complete search history.

(56) References Cited

U.S. PATENT DOCUMENTS

| | | | |
|---|---|---|---|
| 7,080,378 B1 * | 7/2006 | Noland et al. ................. | 718/104 |
| 7,979,834 B1 * | 7/2011 | Duong .......................... | 716/136 |
| 8,380,880 B2 * | 2/2013 | Gulley et al. ................. | 709/248 |
| 8,856,797 B1 * | 10/2014 | Siddiqui et al. ............... | 718/104 |
| 2005/0091217 A1 * | 4/2005 | Schlangen ...................... | 707/10 |
| 2005/0262183 A1 * | 11/2005 | Colrain et al. ................ | 709/200 |
| 2010/0306249 A1 * | 12/2010 | Hill et al. ....................... | 707/769 |
| 2012/0173709 A1 * | 7/2012 | Li et al. .......................... | 709/224 |
| 2013/0060933 A1 * | 3/2013 | Tung et al. ..................... | 709/224 |
| 2013/0290499 A1 * | 10/2013 | Radhakrishnan ............. | 709/223 |

* cited by examiner

*Primary Examiner* — Hamza Algibhah
*Assistant Examiner* — Michael A Chambers
(74) *Attorney, Agent, or Firm* — Kilpatrick Townsend & Stockton LLP

(57) ABSTRACT

One exemplary embodiment involves transmitting a request to a distributed resource system to provide, from a server computer device associated with the distributed computing resource system, network content to a requesting device, the server computer device being located at a geographic location that corresponds to a location of the requesting device. The embodiment further involves measuring at least one of a plurality of performance metrics associated with providing the network content and determining whether to auto scale a plurality of resources associated with the server computer device based at least in part on the at least one of the performance metrics. Additionally, the embodiment involves transmitting a request to the distributed computing resource system to auto scale the resources, responsive to the determination to auto scale the resources associated with the server device.

20 Claims, 4 Drawing Sheets

AUTO-SCALING MANAGEMENT OF WEB CONTENT

FIELD

This disclosure relates generally to computer software and more particularly relates to the creation, modification, use, and distribution of electronic content.

BACKGROUND

Content providers, such as authors of electronic content, distribute the content to users via a distributed computing resource system. For example, the author requests one or more computing system instances from the distributed computing resource system for serving up the electronic content. The computing system instances may be associated with a set of hardware and software resources as indicated by the author for implementing the instance to serve up the electronic content. Users may then request access to the electronic content from client devices. The computer system instances receive the request and serve up the electronic content to the users.

SUMMARY

Disclosed are embodiments for transmitting a request to a distributed resource system to provide, from a computing system instance being implemented on a server computer device associated with the distributed computing resource system, network content to a requesting device, the server computer device being located at a geographic location that corresponds to a location of the requesting device. The embodiment further involves measuring at least one of a plurality of performance metrics associated with providing the network content and determining whether to auto scale a plurality of resources associated with the computing system instance based at least in part on the at least one of the performance metrics. Additionally, the embodiment involves transmitting a request to the distributed computing resource system to auto scale the resources, responsive to the determination to auto scale the resources associated with the server device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Disclosed are embodiments for automatically scaling up or scaling down the hardware resources associated with a computer system instance of a distributed computing resource system based on one or more performance metrics associated with providing network content to users. In one embodiment, the rate at which the requests are processed is based at least in part on the hardware resources associated with the computer system instances. Additionally, the rate at which the content is provided to the requesting client devices is also based at least in part on the hardware resources associated with the computer system instances. To this end, a management service measures one or more performance metrics associated with providing network content to one or more devices via the distributed computing resource system. For example, the management service transmits a request to the distributed computing resource system to instantiate a set of management resources that includes one or more computer system instances on a server computer device associated with the distributed computing resource system for providing the network content. The management service measures performance metrics associated with the computer system instances providing the network content such as a response time for providing the content, a load time for providing the content, a number of web page and/or web site hits, and an available capacity of the server computer implementing the computer system instances.

The management service may then determine whether the measured performance metrics indicate that performance is below a desired threshold level. For example, the management service may determine whether the response time for providing the content is slower than a desired threshold time. If the performance metric is below a desired threshold level, the management service transmits a request to the distributed computing resource system to scale up the hardware resources associated with computer system instance. For example, the amount of hardware resources to scale up may correspond to an amount necessary for improving the performance metric to a satisfactory level. Similarly, the performance metric may also transmit a request to scale down the resources associated with the computer system instance if the performance is excessive.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
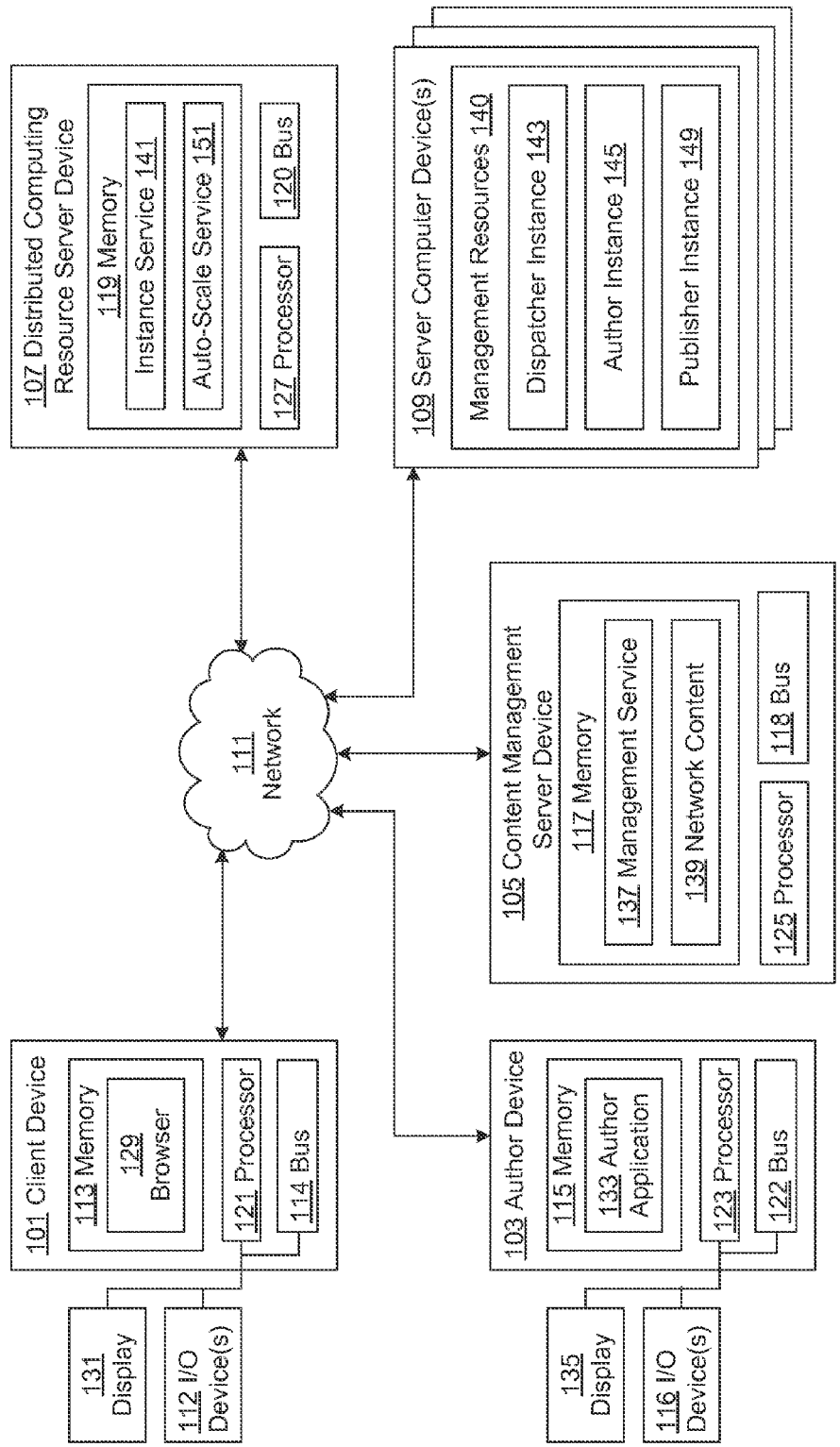
FIG. 1 is a block diagram depicting exemplary computing devices in an exemplary computing environment for implementing certain embodiments.

FIG. 1 depicts an exemplary computing environment for providing network content via a distributed computing resource system. The methods and systems disclosed herein are also applicable on other computing systems and environments. The environment shown in FIG. 1 includes a wired or wireless network 111 connecting various devices 101, 103, 105, 107 and 109. In one embodiment, the network 111 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, the client device 101 is shown with a display 131 and various input/output devices 112, and author device 103 is shown with a display 135 and various input/output devices 116. A bus, such as bus 114, bus 118, bus 120, and bus 122 will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103, 106, and 109 each have a computer-readable medium such as memory 113, 115, 117 and 119 coupled to a processors 121, 123, 125 and 127 that execute computer-executable program instructions and/or accesses stored information. Such processors 121, 123, 125, and 127 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to a component that listens for or otherwise waits for requests or a device that provides one or more such applications that listens for or otherwise waits for requests. Content management server device 105, distributed computing resource server device 107, and server computer devices 109 are examples of a server. A "server device" may be used to implement one or more service, execute one or more applications, and/or perform other functions. For example, the content management server device 105 may include a management service 137, and the distributed computing resource server device 107 may include an instance service 141 and an auto-scale service 151. In one embodiment, the instance service 141 instantiates instances on at least one of the server computer devices for implementing functions and applications associated with hosting and publishing of network content as directed by the content management server device 105. The auto-scale service 151 scales the hardware resources associated with the instances up or down based on a variety of factors, as will be discussed. The management service 137 transmits a request to the distributed computing resource server device 107 to host and publish network content provided by an author of the network content. Additionally, the management service 137 monitors the performance of the server computers implementing the instances and transmits one or more auto-scaling requests to the auto-scale service 151, as will be discussed.

As used herein, the term "distributed computing resource system" refers to a system that provides one or more virtual machines for implementing services and/or applications. In one embodiment, the distributed computing resource system is associated with a plurality of server computer devices that are remotely and programmatically managed by the distributed computing resource system. Each server computer device associated with the distributed computing resource system is divided into one or more virtual machine slots configured to implement an instance. Additionally, each virtual machine slot is associated with a configurable amount of hardware resources such as virtual computational units, memory, disk storage and/or other resources.

As used herein, the term "instance" refers to a virtual machine instance. In one embodiment, a virtual machine instance is an instance of a software implementation of a machine, such as a server computer device, that executes one or more applications like a physical machine. For example, a server computer device is configured to implement one or more computer system instances. In one embodiment, each instance is associated with a set of virtual abstractions of hardware resources such as virtual computing units, memory, and/or hard disk storage. Additionally, each instance is also associated with a set of software resources such as an operating system and/or other applications associated with operating a computer.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, client device 101 includes a memory 113 that includes a browser 129. The browser 129 may render user interfaces on the display 131 associated with the client device 101. Additionally, the author device 103 includes a memory 115 that includes an author application 133. In one embodiment, the author application 133 provides for a user to generate and/or otherwise create network content 139 and transmits a request to the content management server device 105 to host and publish the network content 139 via the distributed computing resource server device 107. The network content 139 may be media, documents, and/or other types of electronic content capable of being hosted on a server device. The author application 133 may also render user interfaces on the display 135 associated with the author device 103.

The content management server device 105 includes a memory 117 that includes a management service 137 and network content 139 received by an author of the network content 139 from the author device 103. In one embodiment, the management service 137 receives a request from the user (i.e., the author) of the author device 103 to host and publish the network content 139 via the distributed computing resource server device 107. In response, the management service 137 transmits a request to the distributed computing resource server device 107 to provide management resources 140 for hosting and publishing the network content 139. In one embodiment, the management service 137 may indicate an amount of hardware resources to associate with the management resources 140. For example, the management service 137 may indicate an amount of hard disk storage, an amount of memory, a number of virtual computing units, and/or indicate any other types of hardware resources associated with implementing the instances. In another embodiment, a default amount of hardware resources may be associated with the management resources 140. For example, the management resources 140 may be implemented by one or more slots of a server computer device 109, where each slot has a predetermined amount of hardware resources, as will be described with respect to FIG. 2. Additionally, the management service 137 may indicate software to be implemented by the management resources 140. For example, the management service 137 may provide one or more operating systems, applications, and/or other types of software to be implemented on the management resources 140 for hosting and publishing the network content 139.

The instance service 141 being implemented on the distributed computing resource server device 107 receives the request from the management service 137 to provide the management resources 140. In response, the instance service 141 instantiates one or more instances to be associated with the requested management resources 140. An instance may be a virtual machine instance that executes instructions provided to the instance. For example, the instance may be associated with a set of hardware resources for execution of the provided instructions. In one embodiment, the instance service 141 instantiates a dispatcher instance 143, an author instance 145, a publisher instance 147, and/or other instances. Each one of the instantiated instances may be associated with an amount of hardware resources as indicated by the management service 137. In another embodiment, each one of the instances may be associated with a default mount of hardware resources.

The dispatcher instance 143 may be implemented to provide load balancing, filtering, security, caching, and/or additional functionality associated with providing the network content 139. In one embodiment, a set of management resources 140 may include more than one publisher instance 149. The dispatcher instance 143 may receive requests from users on client devices 101 to access the network content 139 and dispatch and/or otherwise distribute the requests to the publisher instances 149. For example, the dispatcher instance 143 may employ one or more load balancing techniques for uniformly dispatching the requests from the client devices 101 to the publisher instances 149. Additionally, the dispatcher instance 143 may perform one or more functions related to maintenance of the author instance 145 and the publisher instance 147. In one embodiment, the dispatcher instance 143 is associated with a set of hardware and software resources as indicated by the management service 137.

The author instance 145 may be implemented to allow the author on the author device 103 to create, develop, test, and/or otherwise provide the network content 139. In one embodiment, the author instance 145 implements a set of software applications and tools as specified by the management service 137 to facilitate the creation and development of the network content 139. For example, an author on the author device 103 interacts with the software applications and tools being implemented by the author instance 145 via an interface rendered by the author application 133 on the display 135 of the author device 103. Additionally, the author instance 145 is associated with a set of hardware resources as indicated by the management service 137.

The publisher instance 147 may be implemented to receive requests from one or more users on client devices 101 to access the network content 139 hosted by the distributed computing resource system. In response, the publisher instance 147 provides access to the network content 139. For example, the publisher instance 147 serves up the network content 139 to the requesting user. In one embodiment, the response time for providing the network content 139 upon receiving the request is based at least in part on the hardware resources associated with the publisher instance 147. For example, the response time for providing the network content 139 may be based at least in part on the amount of hardware resources associated with the publisher instance 147. Additionally, the response time for providing the network content 139 may be based at least in part on the utilization rate of the hardware resources associated with the publisher instance 147.

Upon instantiating the instances of the management resources 140, the instance service 141 then provisions the management resources to one or more server computer devices 109. In one embodiment, the instance service 141 may provision the instances based on availability of the server computer devices 109. For example, each server computer device 109 may be associated with a number of slots for implementing instances, as will be described with respect to FIG. 2. Each slot may be associated with a number of hardware resources. The hardware resources included with each slot may be computational units. In one embodiment, the computational units may be an abstraction of a set of computer resources and therefore, represent a certain amount of processor usage, a processor speed, an amount of memory, and/or other types of hardware resources. Additionally, each one of the slots may be implementing previously instantiated management resources 140 and thus may be preoccupied. Thus, the instance service 141 may provision the management resources 140 based at least in part on the availability of the server computer devices 109. For example, the amount of availability of the server computer devices 109 may need to correspond to the amount of hardware resources associated with the instantiated management resources 140.

Once provisioned, the instances of the management resources 140 are implemented by the server computer devices 109. In one embodiment, the management service 137 monitors the performance of the server computer devices 109 that are implementing the instances of the management resources 140. For example, the management service 137 measures performance metrics such as a number of network content 139 page hits, a number of network 139 content site hits, a response time for serving up the network content 139, a load time of the network content 139, an available capacity of the server device 109, and/or any other performance metric associated with implementing the instances.

In one embodiment, the network content 139 hosted by the server computer devices 109 is provided to requesting users on client devices 101. For example, a user on the client device 101 may manipulate one or more user interfaces rendered on the display 131 associated with the client device 101 to transmit a request for accessing the network content 139. The request for accessing the network content 139 may be received by the server computer device 109 hosting the instances. For example, the publishing instance 149 may include one or more applications and/or services that receive the request for access to the network content 139. In response, the applications and/or services of publishing instance 149 may transmit the network content 139 in one or more network pages to the requesting client device 101 over the network 111. For example, the network page may be an internet web page.

In one embodiment, the management service 137 measures the performance of the server computer device 109 implementing the publisher instance 149. For example, the management service 137 may measure a response time for providing the network content 139. To this end, the management service 137 measures an amount of time need for the applications being implemented on the publisher instance 149 to receive the request for accessing the network content 139 from the client device 101 and initiating transmission of the requested network content 139 to the client device 101. For example, the network content 139 may be provided via a web site, a web page, and/or some other user interface that includes the network content 139. In one embodiment, the management service 137 may begin measuring the response time from the time the request is received by the server computer device 109 implementing the publisher instance 149 to the time that the network content 139 is prepared and transmission of the network content 139 begins.

In one embodiment, the response time measured by the management service 137 may be based at least in part on the availability of the hardware resources associated with the publisher instance 149. For example, if the computing units (i.e., virtual processors, memory, hard disk storage) associated with the publisher instance 149 are preoccupied executing one or more other instructions, the response time measured by the management service 137 may be slower than if the computing units are not preoccupied. Increasing the amount of hardware resources associated with the publisher instance 149 may result in a faster response time. For example, the publisher instance 149 may be able to process the same number of instructions faster because more hardware resources are available to perform the execution.

To this end, the management service 137 may determine whether the measured response time is at a desired time. If the response time is slower than the desired time, the management service 137 transmits a request to the auto-scale service 151 to increase the amount of hardware resources associated with the publisher instance 149. The auto-scale service 151 automatically scales up or scales down the hardware resources associated with an instance upon receiving the request from the management service 137. For example, additional hardware available on the server computer device 109 implementing the publisher instance 149 may be associated with the publisher instance 149. As discussed above, the hardware resources associated with each instance may be virtual abstractions of physical hardware available on the server computer device 109. When the auto-scale service 151 receives the request to scale the resources, the auto-scale service 151 increases and/or decreases the virtual abstractions of the physical hardware resources that are associated with the respective instance. In one embodiment, the amount of resources scaled up and/or scaled down may correspond to an amount needed to improve the response time to be equal to or better than desired time.

In another embodiment, the management service 137 may also determine to automatically scale down the resources associated with the publisher instance 149. For example, the measured response time may faster than desired maximum time. In this example, the response time for providing the network content 139 may be made slower and still be at a desired speed. The management service 137 transmits a request to the auto-scale service 151 to scale down the resources associated with the publisher instance 149. In one embodiment, scaling down the hardware resources may advantageously reduce overall power consumption, financial resources and/or other provide other advantages.

The management service 137 may also measure other performance metrics that are related to the response time. For example, the management service 137 may measure the utilization rate of the hardware resources associated with the publisher instance 149. In one embodiment, a higher utilization rate of the resources may correspond to a slower response time for providing the network content 139 than a lower utilization rate. The publisher instance 149 may be executing a large number of instructions simultaneously thereby increasing the utilization rate of the hardware resources. The management service 137 may determine whether the utilization rate is less than a desired maximum rate. If the measured utilization rate exceeds the desired maximum rate, the management service 137 may transmit a request to the auto-scale service 151 to automatically scale up the resources associated with the publisher instance 149.

The management service 137 may also measure the load time of the network content 139 on the requesting client device 101. For example, the load time of the network content 139 may be the amount of time that elapses from the time that the publisher instance 149 begins transmitting the network content 139 to the time that the client device 101 begins receiving the transmitted network content 139. In one embodiment, the management service 137 may include an executable and/or application with the transmitted network content 139. Upon receipt of the executable by the client device, the executable may be automatically implemented to transmit a time stamp and/or other time indicator to the management service 137. The management service 137 may then determine the load time of the network content 139 based on the time stamp received from the client device 101. For example, the management service 137 may have recorded a time stamp when transmission of the network content 139 began via the publisher instance 149. The difference in the recorded time stamp and the received time stamp may correspond to the load time of the network content 139.

Having determined the load time of the network content 139, the management service 137 may then determine whether to transmit a request to the auto-scale service 151 to automatically the scale the resources of the publisher instance 149. In one embodiment, the load time of the network content 139 may be related to the latency of the network 111. For example, a smaller network bandwidth may result in slow transmission of data throughout the network 111. In one embodiment, scaling the resources of the publisher instance 149 being implemented on a server computer device 109 geographically associated with the network 111 may improve the network latency. For example, when a user on the client device 101 transmits a request to access the network content 139, a publisher instance 149 being implemented by a server computer device 109 that is at a geographic location corresponding to the geographic location of the client device 101 receives the request. In one embodiment, the publisher instance 149 of the server computer device 109 geographically closest to the client device 101 receives the request. Scaling up the resources associated with the publisher instance 149 being implemented on the server computer device 109 that is at a location corresponding to the geographic location of the client device 101 may improve the network latency in the transmission of the network content 139. Consequently, the load time of the network content 139 may improve. In one embodiment, if the load time of the network content 139 exceeds a threshold amount of time, the management service 137 may transmit a request to the auto-scale service 151 to scale up the resources associated with the publisher instance 149 of the server computer device 109 that geographically corresponds to the client device 101.

Figure 2:
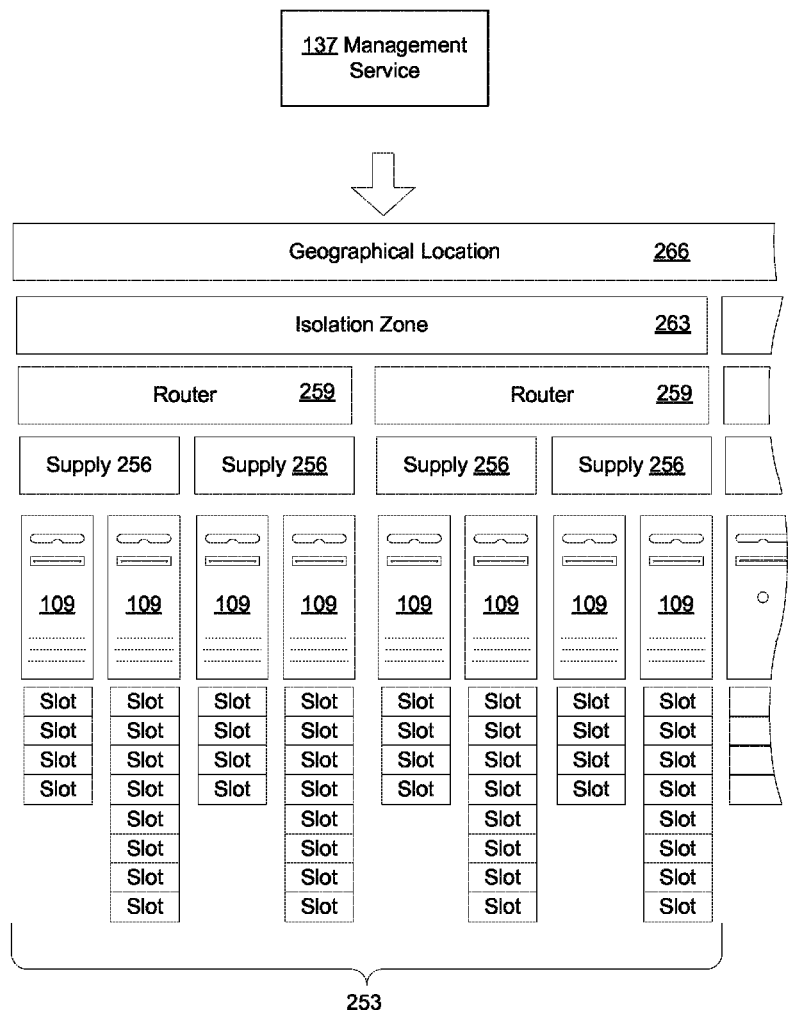
FIG. 2 is a block diagram depicting exemplary server computer devices associated with a distributed computing resource system according to certain embodiments.

FIG. 2 is a computing system diagram showing components of the management service 137 disclosed herein for determining whether to scale the resources associated with the instantiated instances on one or more server computer devices 109. Shown are the server computers 109 (FIG. 1) in communication with the distributed computing resource system 107 (FIG. 1). In one embodiment, the collection of server computer devices 209 may be viewed as a data center that includes virtual machine slots 253, physical hosts 216 (ie, server computers), power supplies 256, routers 259, isolation zones 263, and geographic locations 266. The server computer devices 209 may be shared by multiple virtual machine slots 253, each slot 253 capable of holding a guest operating system. Multiple server computer devices 209 may share a power supply 256, such as a power supply 256 provided on a server rack. A router 259 may service multiple server computer devices 209 across several power supplies 256 to route network traffic. An isolation zone 263 may service many routers 259, the isolation zone 263 being a group of computing resources that are serviced by redundancies such as backup generators. Multiple isolation zones 263 may reside at a geographical location 266, such as a data center.

The management service 137 may executed on a server device that includes a memory and processor configured with instructions to analyze utilization and/or availability of the server computers 109 and determine whether to scale up or down the hardware resources associated with the slots of the respective server computers 109. For example, the instances of the management resources 140 (FIG. 1) that are hosting and publishing the network content 139 (FIG. 1) provided by the author are implemented on the slots of the server computers 109. In one embodiment, each one of the dispatcher instances 143, the author instances 145, and the publisher instance 149 of the management resources 140 are implemented on a respective one of the slots of a server computer 109. Each slot may be associated a set of hardware resources for implementing the instances. For example, the amount of hardware resources may be specified by the management service 137 and/or may be a default amount as provided by the instance service 141 (FIG. 1). The management service 137 monitors the performance and utilization of the server computers 109 to determine whether to scale up and/or scale down the hardware resources associated with each slot of the server computer 109. For example, the management service 137 measures one or more performance metrics, as discussed above, and transmits a request to the auto-scale service 151 (FIG. 1) to scale up and/or scale down the hardware resources based on the measured performance metrics.

Figure 3:
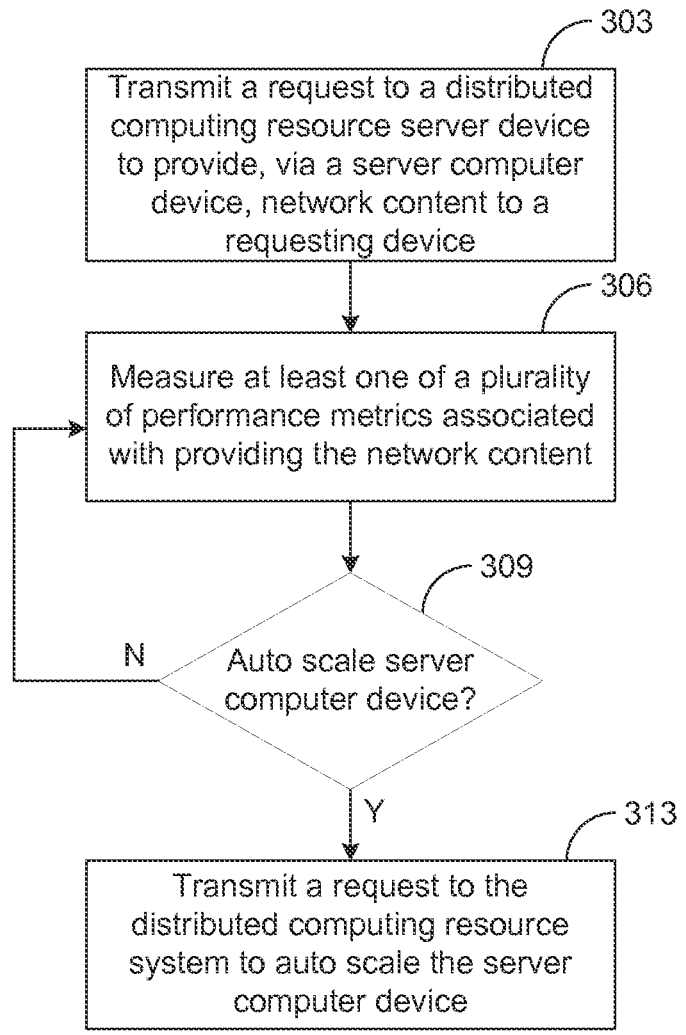
FIG. 3 is a flow chart illustrating an exemplary method of a management service for determining whether to auto scale the resources of a server computer device based at least in part on one or more performance metrics.

FIG. 3 is a flowchart that provides one example of the operation of a portion of the management service 137 according to certain embodiments. It is understood that the flowchart of FIG. 3 provides merely an example of the many different types of functional arrangements that may be employed to implement the operation of the portion of the management service 137 as described herein. As an alternative, the flowchart of FIG. 3 may be viewed as depicting an example of steps of a method implemented in the content management server device 105 (FIG. 1) according to one or more embodiments.

Beginning with step 303, the management service 137 transmits a request to a distributed computing resource server device 107 (FIG. 1) to provide, via a server computer device 109 (FIG. 1) to provide network content 139 (FIG. 1) to a requesting device. In one embodiment, the network content 139 may be media, documents, content related to an electronic commerce shop, and/or other types of electronic content available over a network. Additionally, the network content 139 may be provided by an author of the content via an author device 103 (FIG. 1). The management service 137 transmits a request to an instance service 141 (FIG. 1) implemented on the distributed computing resource server device 107 to instantiate one or more instances for hosting, publishing, serving up and/or otherwise providing the network content 139 to requesting users. Additionally, the management service 137 may also include in the request a set of specifications related to hardware and software resources to be implemented via the distributed computing resource server device 107, as described above. In one embodiment, the instance service 141 provides a set of management resources 140 (FIG. 1) that includes at least one dispatcher instance 143, one author instance 145, and one publisher instance 149. Additionally, the instance service 141 provisions the instances of the management resources 140 to one or more server computer devices 109 for implementation.

Next, in step 306, the management service 137 measures least one of a plurality of performance metrics associated with providing the network content 139 to the requesting device. For example, the requesting device may be a client device 101 (FIG. 1). In one embodiment, the performance metrics includes a number of network content 139 page hits, a number of network content 139 site hits, a response time for serving up the network content 139, a load time of the network content 139, an available capacity of the server device 109, and/or other performance metrics associated with providing the network content 139. The response time for serving up the network content 139 may be measured from the time that the server computer device 109 providing the management resources 140 receives the request from the client device 101 until the time that the transmission of the network content 139 to the client device 101 begins. The load time of the network content 139 may be measured from the time that transmission of the network content 139 begins from the server computer device 109 until the network content 139 is received at the client device 101. For example, an executable may be transmitted in conjunction with the requested network content 139 that transmits a time stamp to the management service 137 upon receipt by the client device 101, as described above. Additionally, the available capacity of the server device 109 may be determined from the available capacity of the slots associated with the server device 109, as described above.

Next, in step 309, the management service 137 determines whether to auto scale the resources associated with the server computer device 109 based at least in part on the measured performance metrics. In one embodiment, the management service 137 determines whether to scale the resources based on whether the response time exceeds a threshold time, whether the load time exceeds a threshold time, whether the number of page hits and/or web site hits exceeds a threshold number, whether the available capacity of the server computer device 109 falls below a threshold amount, as described above. If the management service 137 determines that the performance metric exceeds the respective threshold, then the management service 137 advances to step 313. If the management service 137 determines that the performance metric does not exceed the respective threshold, then the management service 137 returns to step 306 to perform additional measurements of the performance metrics.

Then, in step 313, the management service 137 transmits a request to auto scale the resources associated with the server computer device 109. For example, the management service 137 may transmit a request to the auto-scale service 151 (FIG. 1) scale up the resources associated with the server computer device 109 implementing the management resources 140. In one embodiment, the amount of resources to scale up the resources corresponds to an amount necessary to improve the measured performance metric. In another embodiment, the management service 137 may transmit a request to scale down the resources associated with the server computer device 109 as described above.

Figure 4:
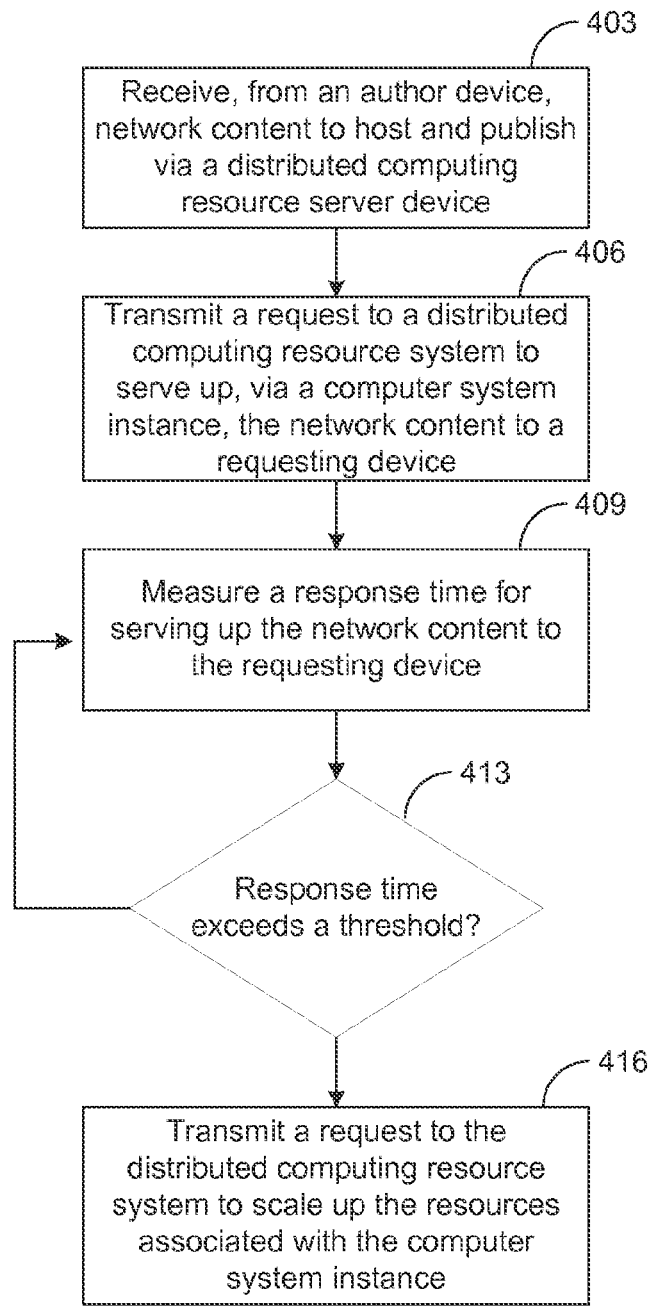
FIG. 4 is a flow chart illustrating an exemplary method of a management service for determining whether to auto scale the resources of a computer system instance based at least in part on a response time for serving up electronic content.

FIG. 4 is a flowchart that provides one example of the operation of a portion of the management service 137 according to certain embodiments. It is understood that the flowchart of FIG. 4 provides merely an example of the many different types of functional arrangements that may be employed to implement the operation of the portion of the management service 137 as described herein. As an alternative, the flowchart of FIG. 4 may be viewed as depicting an example of steps of a method implemented in the content management server device 105 (FIG. 1) according to one or more embodiments.

Beginning with step 403, the management service 137 receives, from an author on an author device 103 (FIG. 1), network content 139 to host and publish via a distributed computing resource server device 107 (FIG. 1). In one embodiment, the network content 139 may be media, documents, content related to an electronic commerce shop, and/or other types of electronic content available over a network. For example, the author on the author device 103 may manipulate one or more user interfaces rendered on a display 135 (FIG. 1) associated with the author device 103 to provide the network content 139.

In step 406, the management service 137 transmits a request to the distributed computing resource server device 107 to provide, via a computer system instance to provide the network content 139 to a requesting device. In one embodiment, the management service 137 transmits a request to an instance service 141 (FIG. 1) being implemented on the distributed computing resource server device 107 to instantiate one or more computer system instances for hosting, publishing, serving up and/or otherwise providing the network content 139 to requesting users. Additionally, the management service 137 may also include in the request a set of specifications related to hardware and software resources to be associated with the computer system instance, as described above. In one embodiment, the instance service 141 provides a set of management resources 140 (FIG. 1) that includes at least one dispatcher instance 143, one author instance 145, and one publisher instance 149. Additionally, the instance service 141 provisions the instances of the management resources 140 to one or more server computer devices 109 for implementation.

Next, in step 409, the management service 137 measures a response time for serving up the network content 139 associated with providing the network content 139 to the requesting device. For example, the requesting device may be a client device 101 (FIG. 1). In one embodiment, the response time for serving up the network content 139 may be measured from the time that the server computer device 109 providing the management resources 140 receives the request from the client device 101 until the time that the transmission of the network content 139 to the client device 101 begins, as described above. Additionally, the management service 137 may measure other performance metrics such as a number of network content 139 page hits, a number of network content 139 site hits, a load time of the network content 139, an available capacity of the server device 109, and/or other performance metrics associated with providing the network content 139.

In step 413, the management service 137 determines whether to auto scale the resources associated with the computer system instance. To this end, the management service 137 determines whether the response time for serving up the network content 139 exceeds a predetermined threshold amount. If the response time exceeds the threshold amount of time, then the management service 137 advances to step 416. If the response time does not exceed the threshold amount of time, then the management service 137 returns to step 409 to measure additional response times.

Then, in step 416, the management service 137 transmits a request to the auto-scale service 151 (FIG. 1) being implemented on the distributed computing resource server device 107 to scale up the resources associated with the computer system instances. In one embodiment, the amount of resources to scale up corresponds to an amount necessary to improve the measured response time. In another embodiment, the management service 137 may transmit a request to scale down the resources associated with the computer system instance, as described above. For example, the management service 137 may transmit a request to scale down the resources associated with the computer system instance if the response time is faster than a threshold amount.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method for auto scaling resources in a distributed computing resource system comprising a plurality of server computer devices using virtual machine instances to implement hosting and publishing of network content, the method comprising:
    instantiating the virtual machine instances, the virtual machine instances comprising a dispatcher instance that receives requests for network content and distributes the requests to publisher instances and a publisher instance that provides the network content;
    provisioning the resources to the plurality of server computer devices to implement the virtual machine instances;
    measuring associated with providing the network content to a requesting device from a server computer device associated with the distributed computing resource system, the server computer device being located at a geographic location that corresponds to a location of the requesting device, wherein the performance metric comprises a response time for serving up the network content based at least in part on the utilization rate of resources associated with the publisher instance implemented on the server computer device;
    determining to auto scale the resources associated with the publisher instance on the server computer device based at least in part on the performance metric; and
    responsive to the determination to auto scale the resources associated with the server device, transmitting a request to the distributed computing resource system to auto scale the resources.

2. The computer-implemented method of claim 1, wherein the performance metrics comprise a number of network content page hits, a number of network content site hits, a response time for serving up the network content, a load time of the network content or an available capacity of the server device.

3. The computer-implemented method of claim 1, wherein the request to auto scale the resources is one of a request to scale up the resources associated with the server device or a request to scale down the resources associated with the server device.

4. The computer-implemented method of claim 1, wherein the resources associated with the server device comprise at least one of hard disk storage, memory, or virtual computing resources.

5. The computer-implemented method of claim 1, wherein determining whether to auto scale the resources comprises:
    determining whether a response time for serving up the network content is slower than a threshold amount of time, wherein the response time for serving up the network content is based at least in part an amount of time to serve up the network content upon receiving a request to access the network content from the requesting device; and
    responsive to the determination that the response time for serving up the network content is slower than the threshold amount of time, determining to scale up the resources associated with the server device.

6. The computer-implemented method of claim 1, wherein determining whether to auto scale the resources comprises:
    determining whether an available capacity of the server device is less than a threshold availability, the available capacity and threshold amount corresponding to a utilization rate of the resources associated with the server computer;
    determining whether a response time for serving up the network content is slower than a threshold amount of time; and
    responsive to the determination that the available capacity of the server device is less than a threshold availability and the determination that the response time for serving up the network content is slower than the threshold amount of time, determining to scale up the resources associated with the server device.

7. The computer-implemented method of claim 1, wherein determining whether to auto scale the resources comprises:
    determining whether an available capacity of the server device is less than a threshold availability, the available capacity and threshold amount corresponding to a utilization rate of the resources associated with the server computer; and
    responsive to the determination that the available capacity of the server device is less than a threshold availability, determining to scale up the resources associated with the server device.

8. The computer-implemented method of claim 1, wherein determining whether to auto scale the resources comprises:
    determining whether a response time for serving up the network content is faster than a second threshold amount of time; and
    responsive to the determination that the response time for serving up the network content is faster than the second threshold amount of time, determining to scale down the resources associated with the server device.

9. The computer-implemented method of claim 1, wherein determining whether to auto scale the resources comprises:
    determining whether a load time of the network content slower than a third threshold amount of time, the load time of the network content corresponding to a network latency; and
    responsive to the determination that the load time of the network content is slower than the third threshold amount of time, determining to scale up the resources associated with the server computer associated with the network.

10. The computer-implemented method of 3, wherein the amount of resources increased or decreased corresponds to an amount of resources for improving the measured at least one performance metric.

11. A system for auto scaling resources provided by a plurality of server computer devices using virtual machine instances to implement hosting and publishing of network content, the system comprising:
a processor for executing instructions stored in computer-readable medium on one or more devices,
an application comprising one or more modules configured to perform steps comprising:
instantiating the virtual machine instances, the virtual machine instances comprising a dispatcher instance that receives requests for network content and distributes the requests to publisher instances and a publisher instance that provides the network content;
provisioning the resources to a plurality of server computer devices to implement the virtual machine instances;
measuring a performance metric associated with serving up network content to a requesting device from a server computer device associated with the distributed computing resource system, the server computer device being located at a geographic location that corresponds to a location of the requesting device, wherein the performance metric comprises a response time for serving up the network content based at least in part on the utilization rate of resources associated with the publisher instance implemented on the server computer device;
determining to auto scale the resources associated with the publisher instance based at least in part on the performance metric; and
responsive to the determination to auto scale the resources associated with the publisher instance, transmitting a request to a distributed computing resource system to auto scale the resources.

12. The system of claim 11, wherein the performance metrics comprise a number of network content page hits, a number of network content site hits, a response time for serving up the network content, a load time of the network content or an available capacity of the server device.

13. The system of claim 11, the computer system instance is implemented on a server computer device associated with the distributed computing resource system.

14. The system of claim 11, wherein the amount of resources scaled up or scaled down corresponds to an amount of resources for improving the measured at least one performance metric.

15. The system of claim 11, wherein determining whether to auto scale the resources comprises:
determining whether a response time for serving up the network content is slower than a threshold amount of time, wherein the response time for serving up the network content is based at least in part an amount of time to serve up the network content upon receiving a request, from a requesting device, to access the network content; and
responsive to the determination that the response time for serving up the network content is slower than the threshold amount of time, determining to scale up the resources associated with the computer system instance.

16. The system of claim 11, wherein determining whether to auto scale the resources comprises:

determining whether a response time for serving up the network content is faster than a second threshold amount of time; and
responsive to the determination that the response time for serving up the network content is faster than the second threshold amount of time, determining to scale down the resources associated with the computer system instance.

17. The system of claim 11, wherein the computer system instance is implemented on a server computer device located at a geographic location that corresponds to a location of a requesting device to which the network content is served up.

18. A non-transitory computer-readable medium on which is encoded program code for auto scaling resources in a distributed computing resource system comprising a plurality of server computer devices using virtual machine instances to implement hosting and publishing of network content, the program code comprising program code for:
receiving, from an author device, network content to host and publish via a distributed computing resource system;
instantiating the virtual machine instances, the virtual machine instances comprising a dispatcher instance that receives requests for network content and distributes the requests to publisher instances and a publisher instance that provides the network content;
provisioning the resources to the plurality of server computer devices to implement the virtual machine instances;
measuring a performance metric associated with providing the network content to a requesting device from a server computer device associated with the distributed computing resource system, the server computer device being located at a geographic location that corresponds to a location of the requesting device, wherein the performance metric comprises a response time for serving up the network content based at least
in part on the utilization rate of resources associated with the publisher instance implemented on the server computer device
determining to auto scale the resources associated with the publisher instance based at least in part on the performance metric; and
responsive to the determination to auto scale the resources associated with the publisher instance, transmitting a request to the distributed computing resource system to auto scale the resources.

19. The non-transitory computer-readable medium of claim 18, wherein determining whether to auto scale the resources comprises:
determining whether an available capacity of the server device implementing the computer system instance is less than a threshold availability, the available capacity and threshold amount corresponding to a utilization rate of the resources associated with the server computer;
determining whether a response time for serving up the network content is slower than a threshold amount of time; and
responsive to the determination that the available capacity of the server device is less than a threshold availability and the determination that the response time for serving up the network content is slower than the threshold amount of time, determining to scale up the resources associated with the server device.

20. The non-transitory computer-readable medium of claim 18, wherein determining whether to auto scale the resources comprises:

determining whether a response time for serving up the network content is slower than a threshold amount of time, wherein the response time for serving up the network content is based at least in part an amount of time to serve up the network content upon receiving a request to access the network content from the requesting device; and responsive to the determination that the response time for serving up the network content is slower than the threshold amount of time, determining to scale up the resources associated with the computer system instance.

* * * * *

UNITED STATES PATENT AND TRADEMARK OFFICE
CERTIFICATE OF CORRECTION

| | | |
|---|---|---|
| PATENT NO. | : 9,161,064 B2 | Page 1 of 1 |
| APPLICATION NO. | : 13/592835 | |
| DATED | : October 13, 2015 | |
| INVENTOR(S) | : Anthony Lam | |

It is certified that error appears in the above-identified patent and that said Letters Patent is hereby corrected as shown below:

In The Claims

Column 15, Claim 10, Line 1

Insert --claim-- before 3

Signed and Sealed this
Ninth Day of August, 2016

Michelle K. Lee
*Director of the United States Patent and Trademark Office*